March 11, 1947.   A. W. KELLY   2,417,254
SYNCHRONOUS ELECTRIC ALARM-CLOCK MECHANISM
Filed March 23, 1945   2 Sheets-Sheet 1
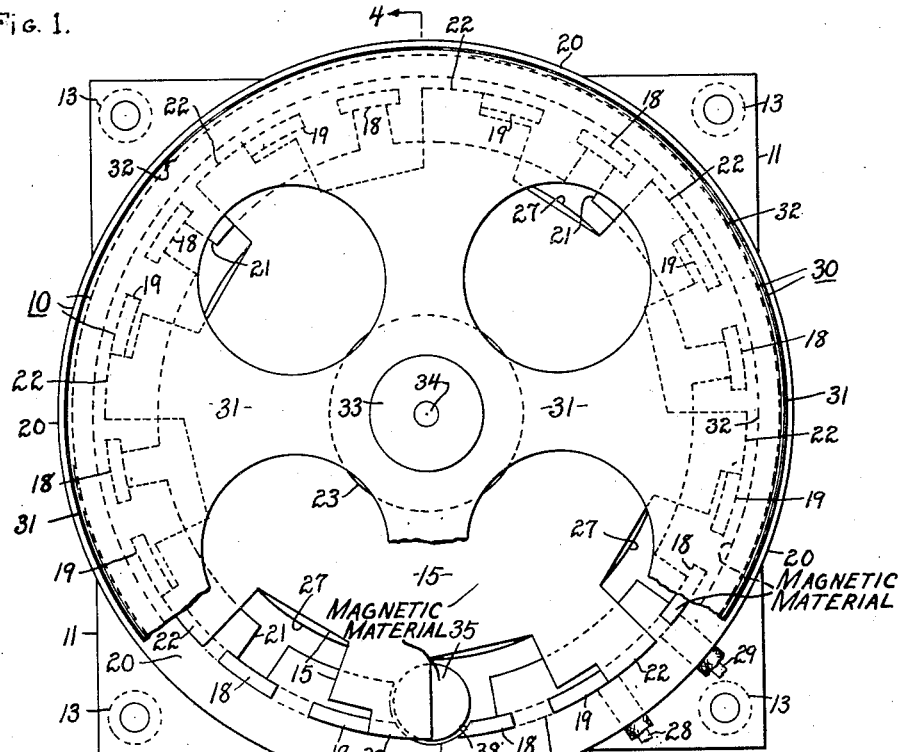
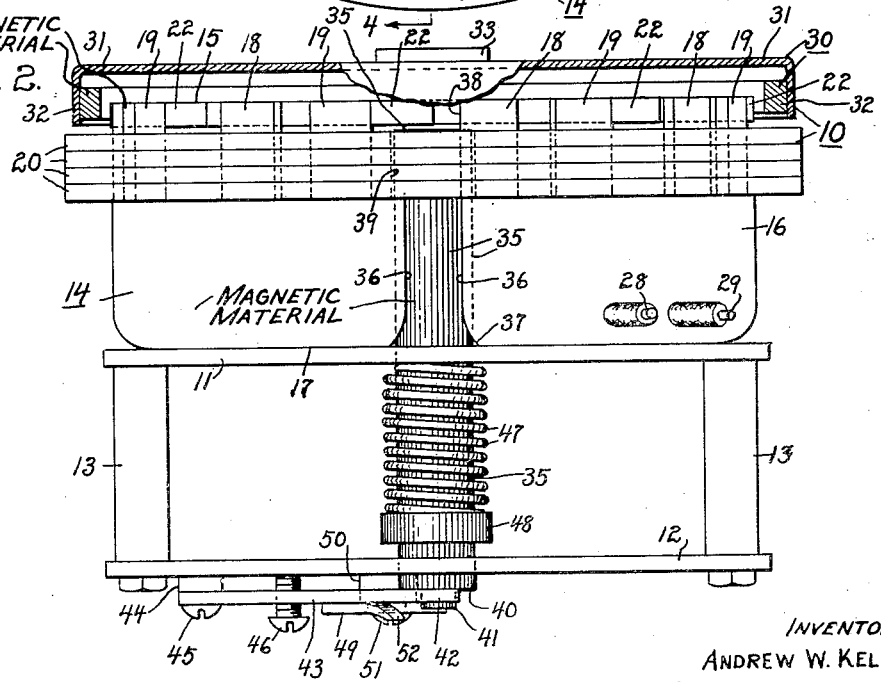
INVENTOR
ANDREW W. KELLY
By Seymour, Carle & Nichols
ATTORNEYS March 11, 1947. A. W. KELLY 2,417,254
SYNCHRONOUS ELECTRIC ALARM-CLOCK MECHANISM
Filed March 23, 1945 2 Sheets-Sheet 2
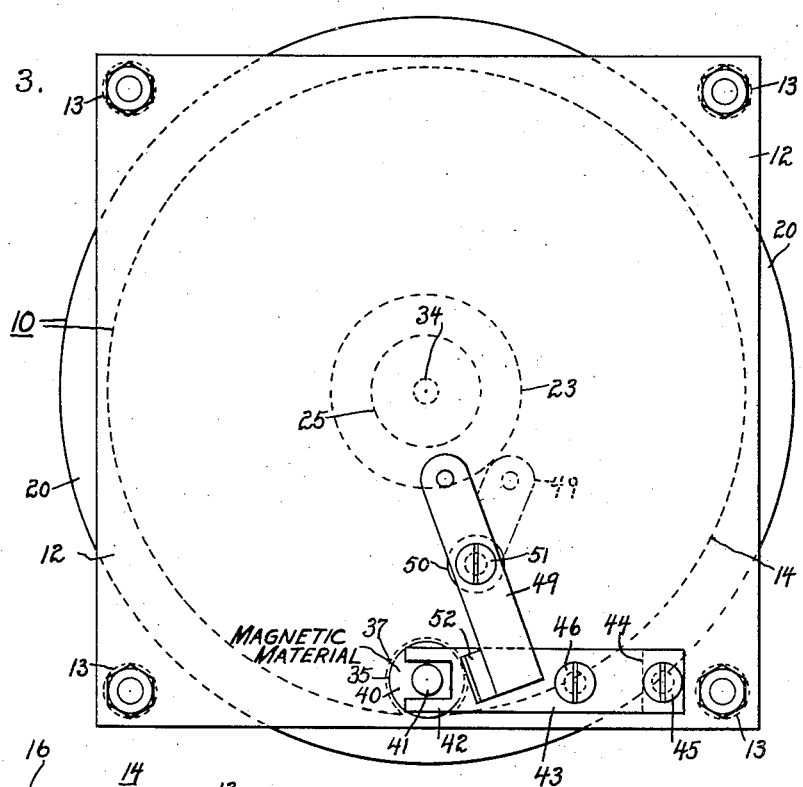
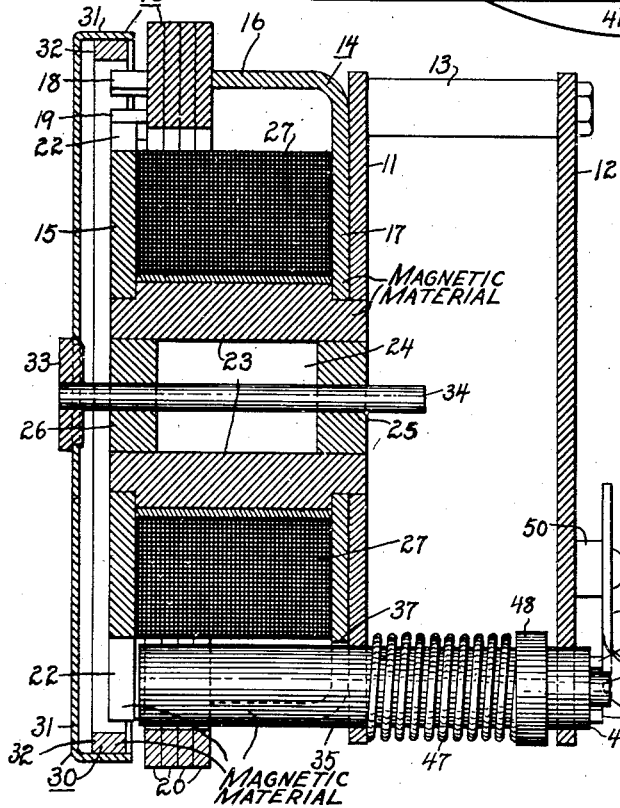
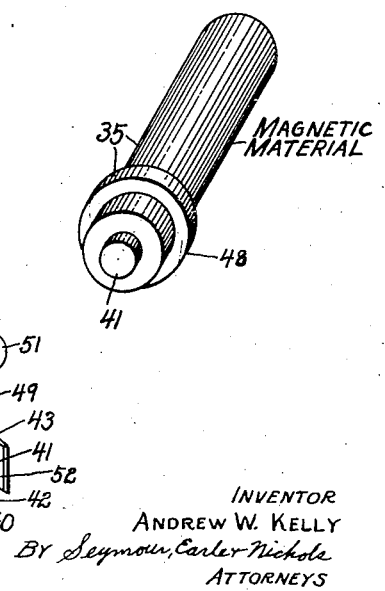
INVENTOR
ANDREW W. KELLY
BY Seymour, Earle Nichols
ATTORNEYS Patented Mar. 11, 1947

2,417,254

UNITED STATES PATENT OFFICE 2,417,254

SYNCHRONOUS ELECTRIC ALARM-CLOCK MECHANISM

Andrew W. Kelly, Bristol, Conn., assignor to The Sessions Clock Company, Forestville, Conn., a corporation of Connecticut Application March 23, 1945, Serial No. 584,236

10 Claims. (Cl. 177—7)

1

The present invention relates to improvements in electric alarm clock mechanisms and relates more particularly to electric alarm clock mechanisms which include a synchronous electric motor for timekeeping purposes, as well as electrically operated audible signal means.

One of the main objects of the present invention is to provide a superior synchronous electric alarm clock mechanism which may be produced at a low cost for manufacture.

Another object of the present invention is to provide a superior mechanism of the character referred to in which the energizing coil of the synchronous electric motor may also be utilized to produce an audible signal or alarm.

A further object of the present invention is to provide a superior synchronous electric alarm clock mechanism characterized by simplicity, compactness and reliability of operation, and in which a vibrating armature may be actuated by the magnetic field of a synchronous electric motor in such manner as to insure vigorous and effective movement of the said armature but without depriving the synchronous motor of its capacity to accurately keep time.

Still another object of the present invention is to provide a superior mechanism of the character referred to which will provide a vigorous and effective sound when desired but which may be rendered inoperative by simple and reliable means.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a rear face view of a synchronous electric alarm clock mechanism embodying one form of the present invention;

Fig. 2 is a bottom edge view thereof;

Fig. 3 is a front face view of the mechanism;

Fig. 4 is a central sectional view taken on the line 4—4 of Fig. 1; and

Fig. 5 is a perspective view of the vibrator or armature, detached.

The synchronous electric alarm clock mechanism shown in the accompanying drawings for purposes of illustrating one form of the present invention, includes a synchronous electric motor generally designated by the reference character 10 and which has its forward face seated against the rear face of a rear movement plate 11.

2

Spaced forwardly of and extending in parallelism with the rear movement plate 11 is a front movement plate 12 coupled to the said rear movement plate by four (more or less) pillars 13.

The synchronous electric motor 10 above referred to is preferably of the self starting type and in the instance shown includes a cup-shaped pole piece generally designated by the reference character 14 and a complemental plate like pole piece generally designated by the reference character 15.

The cup-shaped pole piece 14 includes a lateral wall or flange 16 which extends rearwardly from an integral end wall 17, as is especially well shown in Fig. 4. The rear portion of the flange 16 just referred to is suitably notched to provide a plurality of unshaded pole salients 18 and a plurality of shaded pole salients 19. Both the unshaded pole salients 18 and the shaded pole salients 19 just referred to extend rearwardly from and are integral with the flange 16 of the pole piece 14 and are arranged annularly, so that the said pole salients 18 and 19 alternate with each other in a circumferential direction.

To effect the shading of the pole salients 19 of the pole piece 14, four (more or less) shading rings 20 are employed in superimposed relationship, as is especially well shown in Figs. 2 and 4. The said shading rings are preferably formed of copper or other suitable high electroconductive material and are pierced to closely fit and extend entirely around each of the shaded pole salients 19, to effect a lag in the magnetic flux flowing therethrough. The shading rings 20 are also pierced to clear the unshaded pole salients 18 and, to avoid providing an electrical path around the latter, each of the said shading rings is formed in its inner edge with a plurality of substantially radial inwardly opening notches 21.

The plate like pole piece 15 of the synchronous electric motor 10 is concentric with the cup-shaped pole piece 14 and has its rear or outer face arranged flush with the respective rear or outer ends of the pole salients 18 and 19. The said plate like pole piece 15 is formed in its edge with a plurality of pole salients 22 extending radially and each of which substantially contacts one of the shaded pole salients 19 of the pole piece 14, as is especially well shown in Fig. 1.

Preferably and as shown, the respective outer edges of the pole salients 22 are flush with the outer faces of the annular series of pole salients 18 and 19.

The pole pieces 14 and 15 above referred to are preferably formed of soft iron, though other suitable magnetic material may be employed. The said pole pieces are interconnected centrally by a tubular core piece 23 which is also formed of magnetic material. The said core piece 23 is arranged concentrically with the pole pieces 14 and 15 and extends between the central portion of the end wall 17 of the cup-shaped pole piece 14 and the central portion of the plate like pole piece 15, as is shown in Fig. 4. The tubular core piece 23 is shouldered at its respective opposite ends as is shown in Fig. 4, and may be force-fitted into the respective central portions of the end wall 17 of the pole piece 14 and the central portion of the pole piece 15, to tie the two said pole pieces together.

Tightly fitting the forward end of the central longitudinal passage 24 in the tubular core piece 23, is a front bearing block 25. Tightly fitting the rear portion of the passage 24 is a similar bearing block constituting a rear bearing block 26.

Encircling the core piece 23 and located between the rear face of the end wall 17 of the pole piece 14 and the front face of the plate like pole piece 15, is a ring-like energizing coil 27 provided with two terminal leads 28 and 29 (Figs. 1 and 2) which are adapted to be connected to any suitable source of alternating current such, for instance, as the 110-volt 60-cycle alternating current available in most homes.

Cooperating with the stator structure which includes the elements 14 to 23 inclusive, is a rotor unit generally designated by the reference character 30. The said rotor unit 30 includes a shallow cup-shaped skeletonized mounting member 31, a magnetic ring 32, a bushing 33, and a drive or rotor-shaft 34.

The cup-shaped mounting member 31 of the rotor unit 30 has its flange directed forwardly so as to overlap the rear portion of the stator structure and to closely approach the rear face of the rearmost of the group of shading rings 20. The said mounting member may be conveniently formed of aluminum or other suitable nonmagnetic material and has drive fitted within its forwardly projecting flange, the magnetic ring 32 which latter is formed of hardened steel or other suitable permanent magnet material.

The bushing 33 before referred to is rigidly mounted in the center of the mounting member 31 and, in turn, is rigidly mounted upon the projecting rear end of the rotor shaft 34. The rotor shaft, in turn, extends axially through the interior of the tubular core piece 23 and is supported for rotation in the bearing blocks 25 and 26 therein. The forward end of the rotor shaft 34 projects into the space between the movement plates 11 and 12 so as to be available for connection to any suitable time train (not shown) which may be accommodated in the said space in a manner usual in the clock art.

The space in the passage 24 in the core piece 23 between the front bearing block 25 and the rear bearing block 26 may be utilized to accommodate a body of lubricant.

Mounted for reciprocation in a plane parallel with the rotor shaft 34 but intersecting the lateral wall or flange 16 of the cup-shaped pole piece 14, is a rod-like armature or vibrator 35. The said armature 35 is formed wholly or partly of magnetic material and has its rear end located adjacent the front or inner face of the plate like pole piece 15 and normally slightly spaced forwardly therefrom, as is indicated in Figs. 2 and 4. The lateral wall 16 of the cup-shaped pole piece 14 is cut away as at 36 to accommodate the armature 35, while the end wall 17 of the said pole piece is also cut away as at 37 for a similar purpose. The immediately adjacent unshaded pole salient 18 is also cut away as at 38 to clear the adjacent portion of the armature 35. Similarly, the adjacent portion of the group of shading rings 20 is notched as at 39 to accommodate the said armature.

As before noted, the forward portion of the armature or vibrator 35 extends through and is supported in both the rear movement plate 11 and the front movement plate 12. Integral with and projecting axially forwardly from the front face 40 of the armature 35 is a shut-off stem 41 designed for purposes as will hereinafter appear. The front face 40 of the armature 35 normally rests against the rear face of the bifurcated end 42 of a stop plate 43.

The stop plate 43 extends substantially parallel with and is spaced forwardly of the front movement plate 12 by means of a spacing block 44 located beneath the end of the said stop plate which is remote from its bifurcated end 42. An attaching screw 45 extends through the stop plate 43 and the spacing block 44 into the front movement plate 12, to thereby firmly attach the adjacent end of the said stop plate to the said front movement plate 12.

The spacing of the bifurcated end 42 of the stop plate 43 forwardly of the front movement plate 12 is such as to normally hold the rear end of the armature 35 at its minimum spacing from the forward face of the plate like pole piece 15. For purposes of flexing the stop plate 43 to increase the gap between the rear end of the armature 35 and the forward face of the pole piece 15, the said stop plate has an adjusting screw 46 threaded through it. The said adjusting screw is located substantially midway between the bifurcated end of the stop plate and its opposite end through which the attaching screw 45 extends, and has its rear end engaged with the forward face of the front movement plate 12, as is especially well shown in Fig. 2.

For purposes of normally holding the front face 40 of the armature 35 in engagement with the rear face of the bifurcated end 42 of the stop plate 43, a helical armature-spring 47 is employed. The said armature spring encircles the portion of the armature 35 lying intermediate the rear movement plate 11 and the rear face of an integral collar 48 formed on the said armature adjacent the forward end thereof. The rear end of the armature spring 47 is seated against the forward face of the rear movement plate 11, while the forward end of the said armature spring is seated against the rear face of the collar 48 and serves to yieldingly urge the armature 35 forwardly until the front face 40 thereof is seated against the rear face of the bifurcated end 42 of the stop plate 43.

For purposes of rendering the armature 35 inoperative, a shut-off lever 49 is employed. The said shut-off lever extends substantially parallel with the front movement plate 12 and is held in spaced relationship forwardly thereof by a spacing sleeve 50 located about midway the length of the shut-off lever 49 and interposed between the rear face of the latter and the front face of the front movement plate 12, as is especially well shown in Fig. 4.

Extending rearwardly through the shut-off lever 49 and through the spacing sleeve 50 into threaded engagement with the front movement plate 12, is a pivot screw 51. The lower portion of the shut-off lever 49 is formed with a forwardly sloping cam finger 52 which normally rides just forwardly of the forward face of the stop plate 43 and is adapted to be swung into camming engagement with the rear end of the shut-off stem 41 of the armature 35 to force the said armature rearwardly and firmly hold the rear end of the said armature in engagement with the forward face of the plate-like pole piece 15.

The shut-off lever 49 above described may be both manually operated and may also be automatically operated by any suitable alarm control means (not shown) forming a feature of a suitable clock mechanism driven by the rotor shaft 34 in a general manner well known in the alarm clock art.

When the terminal leads 28 and 29 of the energizing coil 27 are connected to a suitable source of alternating current, the unshaded pole salients 18 of the pole piece 14 and the pole salients 22 of the pole piece 15 will have respectively imparted thereto magnetic polarities of opposite instantaneous character. The magnetization just referred to will be followed almost immediately (about 90 electrical degrees later) by magnetization of the shaded pole salients 19. The magnetic field thus created will provide a synchronous rotating field effect and will act on the hardened magnetic ring 32 of the rotor unit 30 to both start the same and bring it up to and maintain it at synchronous speed.

The turning of the rotor unit 30 will, of course, turn the rotor shaft 34 and the projecting forward end thereof may, as has been before noted, be connected to any suitable clockwork mechanism to propel the same synchronously.

When the shut-off lever 49 is turned into the position in which it is shown by full lines in Figs. 2, 3 and 4, the armature 35 will be free to move axially. At any given instant, magnetic flux of one instantaneous polarity from the cup-shaped pole piece 14 will leak across to the rear portion of the armature 35, thus imparting to the rear end of the said armature a similar polarity. At the same instant, the particular pole salient 22 of the plate like pole piece 15 adjacent which the said armature is located, will be of opposite instantaneous polarity and will pull the said armature rearwardly against the tension of the armature spring 47. As soon as the magnetic flux falls substantially to zero value, the armature spring 47 will assert itself and move the armature 35 forwardly until its forward face 40 engages with the rear face of the stop plate 43. The next half cycle of the current flowing through the energizing coil 27 will again cause the armature 35 to be again drawn rearwardly and so on as long as the said armature is free to reciprocate.

The impact of the rear end of the armature or vibrator 35 against the pole piece 15 and the impact of the forward face of the said armature against the stop plate 43, will produce a vigorous buzzing sound admirably suited for wakening a sleeper.

When it is desired to render the armature or vibrator 35 inoperative, the shut-off lever 49 may be swung into the position in which it is indicated by broken lines in Fig. 3, to thereby cause the cam finger 52 thereof to engage with the rear end of the shut-off stem 41 of the said armature, and thus force the armature rearwardly until its rear face is held firmly in engagement with the forward face of the plate like pole piece 15. Under the conditions last described, the armature 35 will be firmly held against vibration until the shut-off lever 49 or its equivalent is again restored, either automatically or manually, to the position in which it is shown by full lines in Figs. 2, 3, and 4.

By means of the construction and arrangement shown, a synchronous electric alarm clock mechanism may be provided which is not only economical to manufacture and reliable in operation, but which possesses a highly desirable degree of lateral compactness which will enable the mechanism to be mounted in relatively small diametered cases.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A synchronous electric alarm clock mechanism, including in combination: a synchronous electric motor stator structure having a ring-like energizing coil, two complemental pole pieces respectively of opposite instantaneous polarities and together providing a hollow structure in which the said energizing coil is located; a rotor unit extending adjacent both of the complemental pole pieces of the stator structure in position to be synchronously rotated thereby; and a rod-like vibrating armature having its longitudinal axis extending in substantial parallelism with the axis of rotation of the said rotor unit, the said rod-like armature extending closely adjacent both of the said complemental pole pieces in position to provide a magnetic flux path between the two said pole pieces and in position to be vibrated by the alternating magnetic flux developed in the said pole pieces by the said energizing coil.

2. A synchronous electric alarm clock mechanism, including in combination: a synchronous electric motor stator structure having a ring-like energizing coil, two complemental pole pieces respectively of opposite instantaneous polarities and together providing a hollow structure in which the said energizing coil is located, and also providing a lateral wall portion extending along the periphery of the said ring-like energizing coil; a rotor unit extending adjacent both the complemental pole pieces of the stator structure in position to be synchronously rotated thereby; and a rod-like vibrating armature having its longitudinal axis extending in substantial parallelism with the axis of rotation of the said rotor unit and with the periphery of the lateral wall portion of the stator structure, the said rod-like armature extending closely adjacent both of the said complemental pole pieces and the said lateral wall portion in position to provide a magnetic flux path between the two said pole pieces and in position to be vibrated by the alternating magnetic flux developed in the said pole pieces by the said energizing coil.

3. A synchronous electric alarm clock mechanism, including in combination: a synchronous electric motor stator structure having a ring-like energizing coil, two complemental pole pieces respectively of opposite instantaneous polarities and together providing a hollow structure in which the said energizing coil is located, and also providing a lateral wall portion extending along the periphery of the said ring-like energizing coil and spaced outwardly therefrom to provide an armature accommodating space; a rotor unit extending adjacent both the complemental pole pieces of the stator structure in position to be synchronously rotated thereby; a rod-like vibrating armature having its longitudinal axis extending in substantial parallelism with the axis of rotation of the said rotor unit and with the lateral wall portion of the stator structure, the said rod-like armature extending in the space between the said lateral wall portion and the outer periphery of the said energizing coil in position to provide a magnetic flux path between the two said pole pieces and in position to be vibrated by the alternating magnetic flux developed in the said pole pieces by the said energizing coil.

4. A synchronous electric alarm clock mechanism, including in combination: a synchronous electric motor stator structure having a ring-like energizing coil, two complemental pole pieces respectively of opposite instantaneous polarities and together providing a hollow structure in which the said energizing coil is located, and also providing a lateral wall portion extending along the periphery of the said ring-like energizing coil, the said lateral wall portion being cut away to provide a clearance passage for the hereinafter mentioned armature; a rotor unit extending adjacent both the complemental pole pieces of the stator structure in position to be synchronously rotated thereby; and a rod-like vibrating armature having its longitudinal axis extending in substantial parallelism with the axis of rotation of the said rotor unit through the clearance passage in the lateral wall portion of the stator structure, the said rod-like armature extending closely adjacent both of the said complemental pole pieces and the said lateral wall portion in position to provide a magnetic flux path between the two said pole pieces and in position to be vibrated by the alternating magnetic flux developed in the said pole pieces by the said energizing coil.

5. A synchronous electric alarm clock mechanism, including in combination: a synchronous electric motor stator structure having a ring-like energizing coil, two complemental pole pieces respectively of opposite instantaneous polarities and together providing a hollow structure in which the said energizing coil is located, at least one of the said pole pieces being of cup-shaped form having a lateral wall portion extending along the periphery of the said ring-like energizing coil; a rotor unit extending adjacent both the complemental pole pieces of the stator structure in position to be synchronously rotated thereby; and a rod-like vibrating armature having its longitudinal axis extending in substantial parallelism with the axis of rotation of said rotor unit the said rod-like armature extending closely adjacent both of the said complemental pole pieces in position to provide a magnetic flux path between the two said pole pieces and in position to be vibrated by the alternating magnetic flux developed in the said pole pieces by the said energizing coil.

6. A synchronous electric alarm clock mechanism, including in combination: a synchronous electric motor stator structure having a ring-like energizing coil, two complemental pole pieces respectively of opposite instantaneous polarities and together providing a hollow structure in which the said energizing coil is located, at least one of the said pole pieces being of cup-shaped form having a lateral wall portion extending in substantial parallelism with but spaced outwardly from the periphery of the said ring-like energizing coil to provide a space for the accommodation of the hereinafter mentioned armature; a rotor unit extending adjacent both the complemental pole pieces of the stator structure in position to be synchronously rotated thereby; and a rod-like vibrating armature having its longitudinal axis extending in substantial parallelism with the axis of rotation of the said rotor unit and with the lateral wall portion of the cup-shaped pole piece, the said rod-like armature extending mainly in the space between the lateral wall portion of the said cup-shaped pole pieces and the outer periphery of the said energizing coil in position to provide a magnetic flux path between the two said pole pieces and in position to be vibrated by the alternating magnetic flux developed in the said pole pieces by the said energizing coil.

7. A synchronous electric alarm clock mechanism, including in combination: a synchronous electric motor stator structure having a ring-like energizing coil, a cup-shaped pole piece receiving the said ring-like energizing coil, a plate-like pole piece extending across the otherwise open end of the said cup-shaped pole piece; a rotor unit extending adjacent both of the complemental pole pieces of the stator structure in position to be synchronously rotated thereby; and a rod-like vibrating armature having its longitudinal axis extending in substantial parallelism with the axis of rotation of the said rotor unit, the said rod-like armature extending closely adjacent both the said cup-shaped pole piece and the said plate-like pole piece in position to provide a magnetic flux path between the two said pole pieces and in position to be vibrated by the alternating magnetic flux developed therein by the said energizing coil.

8. A synchronous electric alarm clock mechanism, including in combination: a synchronous electric motor stator structure having a ring-like energizing coil, a cup-shaped pole piece receiving the said ring-like energizing coil and having its lateral wall portion located outwardly with respect to the periphery of the said ring-like energizing coil to provide an armature accommodating space, a plate-like pole piece extending across the otherwise open end of the said cup-shaped pole piece; a rotor unit extending adjacent both of the complemental pole pieces of the stator structure in position to be synchronously rotated thereby; a rod-like vibrating armature having its longitudinal axis extending in substantial parallelism with the axis of rotation of the said rotor unit and with the lateral wall portion of the said cup-shaped pole piece, the said rod-like armature extending in the armature accommodating space between the lateral wall portion of the said cup-shaped pole piece and the periphery of the said energizing coil in close proximity to the said plate-like pole piece and in position to provide a magnetic flux path between the two said pole pieces and in position to be vibrated by the alternating magnetic flux developed therein by the said energizing coil.

9. A synchronous electric alarm clock mechanism, including in combination: a synchronous electric motor stator structure having a ring-like energizing coil, two complemental pole pieces respectively of opposite instantaneous polarities and together providing a hollow structure in which the said energizing coil is located; a rotor unit extending adjacent both of the complemental pole pieces of the stator structure in position to be synchronously rotated thereby; a vibrating armature extending closely adjacent both of the said complemental pole pieces in position to provide a magnetic flux path between the two said pole pieces and in position to be vibrated by the alternating magnetic flux developed in the said pole pieces by the said energizing coil; and a cam-like shut-off member constructed and arranged to jam the said armature against one of the said pole pieces to inhibit the vibration of the said armature.

10. A synchronous electric alarm clock mechanism, including in combination: a synchronous electric motor stator structure having a ring-like energizing coil, two complemental pole pieces respectively of opposite instantaneous polarities and together providing a hollow structure in which the said energizing coil is located; a rotor unit extending adjacent both of the complemental pole pieces of the stator structure in position to be synchronously rotated thereby; a rod-like vibrating armature having its longitudinal axis extending in substantial parallelism with the axis of rotation of the said rotor unit, the said rod-like armature extending closely adjacent both of the said complemental pole pieces in position to provide a magnetic flux path between the two said pole pieces and in position to be vibrated by the alternating magnetic flux developed in the said pole pieces by the said energizing coil; and a cam-like shut-off member constructed and arranged to jam the said rod-like armature against one of the said pole pieces to inhibit the vibration of the said armature.

ANDREW W. KELLY.

REFERENCES CITED

The following references are of record in the file of this patent:

UNITED STATES PATENTS

| Number | Name | Date |
|---|---|---|
| 2,002,421 | Tisseyre et al. | May 21, 1935 |
| 2,002,433 | Cowles | May 21, 1935 |
| 2,008,105 | Lawrence et al. | July 16, 1935 |
| 2,008,745 | Carlson et al. | July 23, 1935 |
| 2,069,622 | Perlman | Feb. 2, 1937 |

FOREIGN PATENTS

| Number | Country | Date |
|---|---|---|
| 502,197 | British | Mar. 14, 1939 |